United States Patent
Furukawa

(10) Patent No.: US 8,611,672 B2
(45) Date of Patent: Dec. 17, 2013

(54) WORK PIECE SHAPE ESTIMATION DEVICE AND WORK PIECE SHAPE ESTIMATION METHOD

(75) Inventor: Makoto Furukawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 104 days.

(21) Appl. No.: 13/122,762

(22) PCT Filed: Sep. 4, 2009

(86) PCT No.: PCT/JP2009/004398
§ 371 (c)(1),
(2), (4) Date: Apr. 29, 2011

(87) PCT Pub. No.: WO2010/041374
PCT Pub. Date: Apr. 15, 2010

(65) Prior Publication Data
US 2011/0194754 A1  Aug. 11, 2011

(30) Foreign Application Priority Data

Oct. 8, 2008 (JP) ................................ 2008-262034

(51) Int. Cl.
*G06K 9/46* (2006.01)
*G06K 9/00* (2006.01)

(52) U.S. Cl.
USPC .......................................... 382/203; 382/152

(58) Field of Classification Search
None
See application file for complete search history.

(56) References Cited

U.S. PATENT DOCUMENTS

| | | | | |
|---|---|---|---|---|
| 5,119,439 A | * | 6/1992 | Osawa et al. | 382/199 |
| 5,881,170 A | * | 3/1999 | Araki et al. | 382/199 |
| 6,532,299 B1 | * | 3/2003 | Sachdeva et al. | 382/128 |
| 6,920,248 B2 | * | 7/2005 | Higaki | 382/199 |
| 2007/0165952 A1 | * | 7/2007 | Goto | 382/199 |
| 2007/0177790 A1 | * | 8/2007 | Ban et al. | 382/153 |
| 2008/0082213 A1 | * | 4/2008 | Ban et al. | 700/260 |

FOREIGN PATENT DOCUMENTS

| | | |
|---|---|---|
| JP | 63-052268 | 3/1988 |
| JP | 09-053915 | 2/1997 |
| JP | 10-222670 | 8/1998 |
| JP | 2001-082951 | 3/2001 |
| JP | 2004-333422 | 11/2004 |

OTHER PUBLICATIONS

Rao et al., "Shape Description From Imperfect and Incomplete Data", Jun. 21, 1990, vol. 1, 10th Annual Conference on Pattern Recognition Proceedings, pp. 125-129.*

(Continued)

*Primary Examiner* — David Zarka
*Assistant Examiner* — Ryan P Potts
(74) *Attorney, Agent, or Firm* — Rankin, Hill & Clark LLP

(57) ABSTRACT

A work piece shape estimation device that includes an image information obtaining unit that obtains image information by sensing multiple randomly accumulated work pieces having an identical shape; an edge detection processor that performs an edge detection on the image information obtained by the image information obtaining processor; a separating processor that separates the work pieces into partial images based on the image information obtained by the edge detection processor; a work piece categorization processor that categorizes the separated partial images of the work pieces; and an estimated work piece shape generation processor that generates an estimated shape of the work piece by complementing an information of the partial images of the work pieces categorized by the work piece categorization processor.

4 Claims, 5 Drawing Sheets

| PARTS STATISTICALLY CATEGORIZED BASED ON THE CHARACTERISTIC SHAPE | | | | | | | | ESTIMATED SHAPE |
|---|---|---|---|---|---|---|---|---|
| a | b | c | d | e | f | g | h | T1 |
| AREA RATIO | | | | | | | | |
| 100% | 66% | 82% | 77% | 96% | 47% | 43% | 36% | 100% |
| PRIORITY RANK | | | | | | | | |
| 1ST | 5TH | 3RD | 4TH | 2ND | – | – | – |  |

(56) References Cited

OTHER PUBLICATIONS

IEEE Abstract Citation for "Shape Description From Imperfect and Incomplete Data", 1 page.*
Masuda, T., "Object shape modelling from multiple range images by matching signed distance fields", pertinent pp. 439-448.*
IEEE Abstract Citation for "Shape Registration in Implicit Spaces Using Information Theory and Free Form Deformations", 1 page.*
Rao, K. et al., "Shape Descriptionn From Imperfect and Incomplete Data", Jun. 21, 1990, vol. 1, Proceedings 10th International Conference on Pattern Recognition 1990, pertinent pp. 125-129.*
Bunke, H. et al., "Acquisition of 2D Shape Models From Scenes With Overlapping Objects Using String Matching", Springer-Verlag London Limited, Pattern Analysis & Applications (1999), 8 pages.*
Masuda, T., "Object Shape Modelling From Multiple Range Images by Matching Signed Distance Fields", Proceedings First Symposium on 3D Data Processing Visualization and Transmission, 2002, pertinent pp. 439-448.*
Rao et al., "Shape Description From Imperfect and Incomplete Data," Jun. 21, 1990, vol. 1, 10th Annual Conference on Pattern Recognition Proceedings, pp. 125-129.*
Rao, K. IEEE Abstract Citation for "Shape Description From Imperfect and Incomplete Data," Jun. 21, 1990, vol. 1, 10th Annual Conference on Pattern Recognition Proceedings, 1 page.*
Masuda, T., "Object Shape Modelling from Multiple Range Images by Matching Signed Distance Fields," Jun. 21, 2002, pp. 439-448.*
Huang, Xiaolei. IEEE Abstract Citation for "Shape Registration in Implicit Spaces Using Information Theory and Free Form Deformations," Aug. 2006, 1 page.*
Horst Bunke and Marcel Zumbuhl, "Acquisition of 2D Shape Models from Scenes with Overlapping Objects Using String Matching", Pattern Analysis & Applications, vol. 2, No. 1, Apr. 19, 1999, pp. 2-9, eight pages.

* cited by examiner

FIG. 5

| PARTS STATISTICALLY CATEGORIZED BASED ON THE CHARACTERISTIC SHAPE |||||||| ESTIMATED SHAPE |
|---|---|---|---|---|---|---|---|---|
| a | b | c | d | e | f | g | h | T1 |
| i | j | k | | | | | | T2 |
| l | | | | | | | | |
| m | | | | | | | | |
| n | | | | | | | | |
| o | p | q | | | | | | T3 |

FIG. 6

| PARTS STATISTICALLY CATEGORIZED BASED ON THE CHARACTERISTIC SHAPE | | | | | | | | ESTIMATED SHAPE |
|---|---|---|---|---|---|---|---|---|
| a | b | c | d | e | f | g | h | T1 |
| AREA RATIO | | | | | | | | |
| 100% | 66% | 82% | 77% | 96% | 47% | 43% | 36% | 100% |
| PRIORITY RANK | | | | | | | | |
| 1ST | 5TH | 3RD | 4TH | 2ND | – | – | – | ☒ |

WORK PIECE SHAPE ESTIMATION DEVICE AND WORK PIECE SHAPE ESTIMATION METHOD

TECHNICAL FIELD

The present invention relates to a work piece shape estimation device and a work piece shape estimation method. Particularly, according to the present invention, CAD (Computer Aided Design) data of the work piece is not required at the time of recognizing randomly accumulated multiple work pieces having an identical shape, and a shape model can be automatically generated by statistically organizing work piece shapes based on an image captured by a camera.

This application claims priority on Japanese Patent Application No. 2008-262034 filed on Oct. 8, 2008, the content of which is incorporated herein by reference.

BACKGROUND ART

A positioning device is known for checking whether or not an object produced based on CAD data is correctly produced in accordance with the CAD data. In Patent Document 1, the positioning is adjusted by associating a positioning surface in CAD data which is a basis for the positioning with an object point group corresponding to a positioning surface in non-contact measured data.

Meanwhile, if it is difficult to adjust the position of work pieces, which are piled up on a pallet so as to be automatically supplied to a processing machine, the positions and the attitudes of the work pieces should be detected. Then, Patent Document 2 discloses a matching method including steps of pre-preparing a model of a target work piece, matching the target work piece with the model, and checking the degree of coincidence.

RELATED ART DOCUMENT

Patent Document

[Patent Document 1] Japanese Unexamined Patent Application, First Publication No. 2001-82951
[Patent Document 2] Japanese Unexamined Patent Application, First Publication No. H9-53915

DISCLOSURE OF THE INVENTION

Problems to be Solved by the Invention

However, in any of the above mentioned related techniques, it is necessary to preliminarily store CAD data related to shapes of the objects or work pieces in a data base. Thus, in a case of dealing various kinds of objects or work pieces, CAD data is required for each of the objects or work pieces. Consequently, there is a problem in that a large amount of data is required.

In addition, in the related technique in Patent Document 2, since the randomly accumulated work pieces tend to overlap one another, there is a problem in that it is difficult to perform CAD data matching if an entire shape of the work piece is invisible. Moreover, there is another problem in that since the edge detection divides the image at the overlapped portion of the work piece, it is difficult to recognize which portions are connected to form one piece of a product.

The present invention has been made in view of the above problems, and the object thereof is to provide a work piece shape estimation device that can estimate the shape of a connected portion or an overlapped portion of the overlapped work pieces from image information so as to recognize one work piece without CAD model.

Means for Solving the Problems

The present invention employs the following measures to solve the above problems.

(1) A work piece shape estimation device according to an aspect of the present invention includes: an image information obtaining unit that obtains image information by sensing multiple randomly accumulated work pieces having an identical shape; an edge detection unit that performs an edge detection on the image information obtained by the image information obtaining unit; a separating unit that separates the work pieces into partial images based on the image information obtained by the edge detection unit; a work piece categorization unit that categorizes the separated partial images of the work pieces; and an estimated work piece shape generation unit that generates an estimated shape of the work piece by complementing an information of the partial images of the work pieces categorized by the work piece categorization unit.

(2) In the work piece shape estimation device according to (1), the work piece categorization unit may categorize the partial images separated by the separating unit based on images having a common characteristic shape.

(3) In the work piece shape estimation device according to (1), the work piece categorization unit may categorize the partial images separated by the separating unit based on partial images having a large area.

(4) A work piece shape estimation method according to another aspect of the present invention includes: obtaining image information by sensing multiple work pieces having an identical shape; detecting boundary portions K of the work pieces from the obtained image information; separating the work pieces into partial images based on the detected boundary portions K; categorizing the separated partial images; and complementing the information of the categorized partial images of the work pieces.

(5) In the work piece shape estimation method according to (4), for categorizing the partial images, the separated partial images may be categorized based on images having a common characteristic shape.

(6) In the work piece shape estimation method according to (4), for categorizing the partial images, the separated partial images may be categorized based on partial images having a large area.

Effects of the Invention

According to the aspect of the present invention described in (1), the edge detection unit can detect edges from image information obtained by the image information obtaining unit, the separating unit can separate partial images of overlapped multiple work pieces from the image information obtained by the edge detection, the work piece categorization unit can categorize the separated partial images of the work pieces, and the estimated work piece shape generation unit can generate an estimated work piece shape from the categorized partial images of the work pieces. Therefore, it is easy to recognize randomly accumulated and unarrayed work pieces without the presence of CAD data of the work piece.

In addition, even if the work piece has overlapped and invisible portions, the work piece shape can be estimated by superimposing data of the work piece partial images obtained from the image information so as to complement an absent portion.

Further, according to the aspects of the invention described in (2)-(3), in addition to the effect derived from the aspect of the invention (1), the work piece categorization unit categorizes the partial images of the work pieces upon taking the characteristic portion or the area into consideration. Therefore, the work piece shape can be estimated in a shorter amount of time.

BRIEF DESCRIPTION OF THE DRAWINGS

FIG. 5 shows categorizations of partial images according to the embodiment of the present invention.

FIG. 6 shows the area ratios and the priority ranks according to the embodiment of the present invention.

EMBODIMENTS OF THE INVENTION

Hereinafter, an embodiment of the present invention is explained with reference to the attached drawings.

Figure 1:
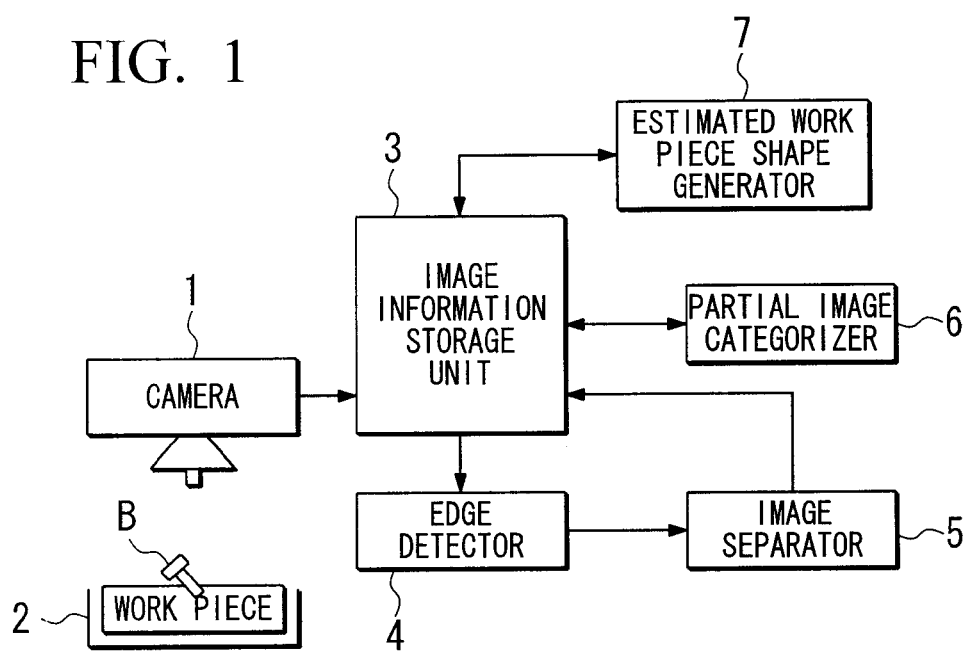
FIG. 1 is a block diagram according to an embodiment of the present invention.

FIG. 1 illustrates a block diagram of a work piece shape estimation device. A camera 1 (image information obtaining unit) obtains two-dimensional image information of multiple work pieces which have the identical shape and are accumulated in the bucket 2 when viewed from above, by sensing (i.e., capturing the image). The image information obtained by the camera 1 is stored in an image information storage unit 3. The image information includes, for example, RGB values of each pixel as brightness-associated image information. As to the image information, distance-associated image information associated with the brightness-associated image information may be obtained for each of the corresponding pixels. In this instance, a three-dimensional image capturing camera which can obtain the distance information is required.

The image information storage unit 3 is connected to an edge detector 4 (edge detection unit) that detects edges in the image based on the stored image information. The edge detector 4 is connected to an image separator 5 (separating unit) that separates the image into each partial image at boundary portions K which are edge portions obtained by the edge detection. The partial images separated by the image separator 5 are stored in the image information storage unit 3.

The partial images are stored in the image information storage unit 3 in a state of being statistically categorized by a partial image categorizer 6 (work piece categorization unit). In each category, the partial images stored in the image information storage unit 3 are superimposed. Then, an estimated work piece shape generator 7 (estimated work piece shape generation unit) eventually obtains an estimated work piece shape by deciding the external edge portion of the superimposed image.

Figure 2:
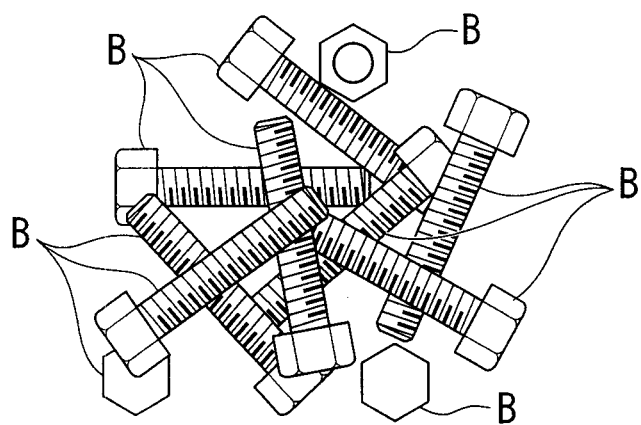
FIG. 2 is a plan view of accumulated work pieces according to the embodiment of the present invention.

FIG. 2 illustrates a state in which multiple bolts B (work pieces) having the identical shape are accumulated in a bucket 2. In this drawing, for simplifying the explanation, the overlapped bolts B accumulated in the bucket 2 are assumed to have two attitudes, one of which is directed to the axis direction of one bolt, and the other of which is directed to the direction perpendicular to the axis direction of said bolt.

As shown in FIG. 2, in the plan view, multiple bolts B are accumulated while being overlapped one another. The camera 1 captures the image of these multiple bolts B. Then, the brightness values (RGB) as brightness-associated image information, and if necessary, the distance values (mm, cm) as distance-associated image information is/are obtained for each pixel and stored in the image information storage unit 3.

Figure 3:
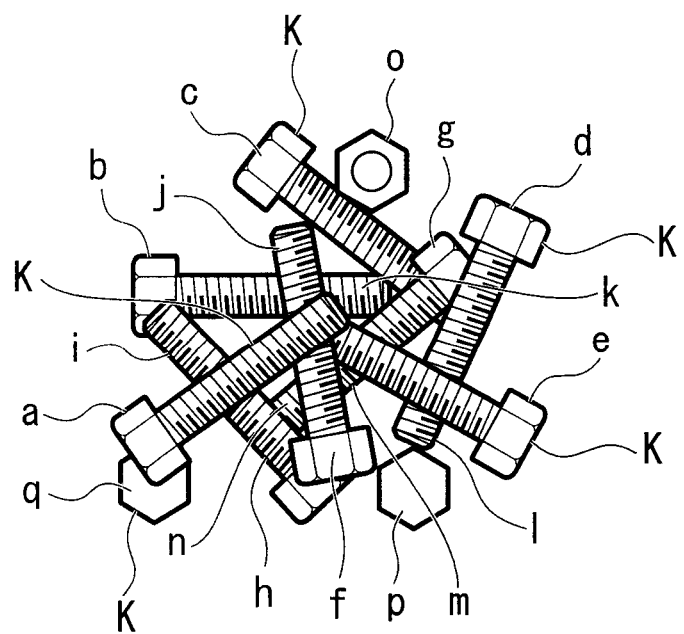
FIG. 3 is a plan view including edge portions according to the embodiment of the present invention.

As shown in FIG. 3, the edge detector 4 detects boundary portions K in the image from the brightness-associated image information stored in the image information storage unit 3, and if necessary, from the distance-associated image information.

The edge detection performed by the edge detector 4 may determine portions having a large variation ratio of the brightness value in the image information as the boundary portions K. However, if it is impossible to perform the edge detection based only on the brightness values, only an image in a certain range is extracted by moving the camera 1 or using a stereo camera and the like, and fixing the range of the distance-associated image information to the predetermined range. This makes it possible to perform the edge detection by using only the brightness-associated image information corresponding to that image. Meanwhile, in FIG. 3, thick lines indicate the boundary portions K.

Figure 4:
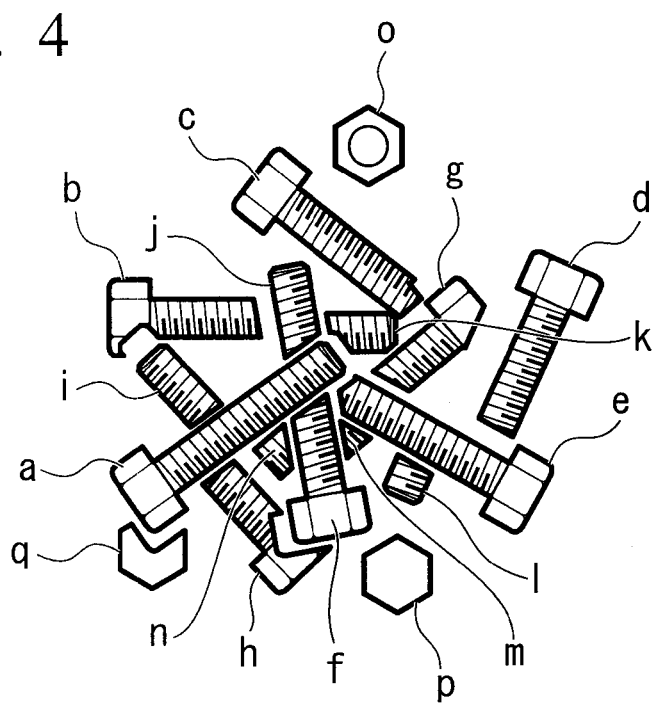
FIG. 4 is a plan view showing a state in which images are separated at edge portions according to the embodiment of the present invention.

As shown in FIG. 4, by the partial image categorizer 6, the image is separated into the partial images "a"-"q" at the boundary portions K indicated in FIG. 3, so as to extract the partial images "a"-"q". The extracted partial images "a"-"q" of the bolts B include a plurality of partially visible portions due to the portions blocked by other bolts B placed above. Therefore, various shaped images are extracted and stored in the image information storage unit 3.

When the partial images "a"-"q" are stored in the image information storage unit 3, the first extracted partial image is firstly stored. Then, if the second extracted partial image matches with the first extracted partial image, the number of the first extracted partial image is added. Meanwhile, if the second extracted partial image does not match with the first extracted partial image, the second extracted partial image is stored in the image information storage unit 3 as a different partial image. In this manner, all the partial images "a"-"q" are stored in the image information storage unit 3. These partial images are stored in the image information unit 3 together with the area information. Meanwhile, if the number of partial images is excessive, the partial images may be limited to the large images. The matching of the images may be performed by a pattern matching.

Then, the partial image categorizer 6 performs the pattern matching on each of the respective partial images and organizes the images having a common characteristic shape, thereby categorizing the partial images statistically (see FIG. 5). In the categorization, the partial image with a larger area is closer to the estimated shape, thus the partial image with a larger area is used as a basis for the categorization. That is, in the first line of FIG. 5, the partial images "a"-"h" including a head portion of the bolt B are laterally categorized as the same category, because these partial images have an area larger than that of the partial images in the second line or lower. Further, in the second line, the partial images "i"-"k" including an axis portion of the bolt B in which the length in the axial direction is longer than the length in the radial direction are laterally categorized as the same category. Moreover, in the third to fifth lines, the partial images "l", "m" and "n" including an axis portion of the bolt B in which the length in the axis direction is shorter than the other portion are respectively categorized. Meanwhile, in the sixth line, the partial images "o", "p" and "q" including at least a part of hexagonal shaped external edge of the head portion of the bolt B are respectively categorized. Note that the categorization table is provided as FIG. 5 (parts statistically categorized based on the characteristic shape) so as to clarify the images stored in the image information storage unit 3.

Then, in order, the estimated work piece shape generator 7 superimposes each of the partial images in the same category, particularly including images with a large area, thereby obtaining the estimated shape of the bolt B. This estimated shape is stored in the image information storage unit 3 together with the partial images.

In this embodiment, each of the partial images "a"-"h" in the same category of the first line in FIG. 5, which includes the partial image "a" with the largest area among the partial images in the other categories, are superimposed in order of the largest area. This makes it possible to obtain an estimated image T1 (the right end of the first line) of the bolt B. An external edge portion of the estimated image T1 thus obtained represents an estimated shape (as a major part) of the bolt B as the work piece, i.e., the partial image "a".

In addition, the partial images in the second line and the sixth line may be respectively superimposed so as to obtain estimated images T2 and T3. As to the superimposing of the partial images, a main image having a larger area may be superimposed by the partial images in the same category so as to complement absent portions, and further, the estimated image T1 in the first line may be superimposed by the estimated image T2 in the second line. Though the estimated image T3 in the sixth line cannot be superimposed to the estimated images in the first and second lines in FIG. 5, the estimated image T3 is assumed as another aspect of the estimated shape of the bolt B (work piece).

Note that since each of the third to fifth lines has one partial image, no estimated image is generated.

Then, the area ratios of the categorized partial images "a"-"q" in FIG. 5 with respect to the estimated shape (including the partial image "a" having the largest area) are calculated, and priority ranks for being preferentially taken out are assigned to partial images in order of the largest area ratio, thereby setting a schedule for taking out the bolts B. Then, based on this schedule, bolts B are taken out one-by-one from a bucket 2 by a robot. FIG. 6 indicates the area ratios of the partial images in the first line of FIG. 5 with respect to the estimated image, and priority order (ranks) for being taken out.

More specifically, the partial image "a" having the area ratio of 100% is assigned with the first (1st) priority rank, the partial image "b" having the area ratio of 66% is assigned with the fifth (5th) priority rank, the partial image "c" having the area ratio of 82% is assigned with the third (3rd) priority rank, the partial image "d" having the area ratio of 77% is assigned with the fourth (4th) priority rank, and the partial image "e" having the area ratio of 96% is assigned with the second (2nd) priority rank. The partial image "f" has an area ratio of 47%, the partial image "g" has an area ratio of 43%, and the partial image "h" has an area ratio of 36%. Since the partial images "f", "g", and "h" have a small area (not more than 50%), priority rank is not assigned. Therefore, after taking out bolts B assigned with the first to fifth ranks, the area ratio or rank may be determined when the categorization is again performed.

Here, the area ratio and the priority rank are both stored in the image information storage unit 3. As to the partial images, one bolt may be indicated in several partial images. Therefore, in order, bolts B categorized in the first line of FIG. 5 may be taken out, and then, the bolts B in the second line or lower may be taken out. In addition, when the work pieces in the first line are taken out, the image may be captured again by the camera 1 so as to repeat the same processes described above and take out the work pieces.

Thus, according to the above embodiment, the camera can sense multiple bolts B accumulated on the bucket 2 from above; the edge detector 4 can detect boundary portions K as edge portions, from the obtained two dimensional image information; the image separator 5 can separate partial images of the overlapped bolts B from the image information obtained by the edge detection; the partial image categorizer 6 can categorize the partial images of the bolt B from the separated partial images of the bolts B; and the estimated work piece shape generator 7 can generate an estimated shape of bolt B from the categorized partial images of the bolt B. Therefore, even if the CAD data of the bolt B is preliminary prepared, randomly accumulated and unarrayed bolts B can be easily recognized. Accordingly, there is no need to prepare a database for the bolt B.

Further, the partial image categorizer 6 may categorize the partial images upon taking characteristic portions or the areas into consideration, so as to further speed up the process.

Furthermore, even if bolts B having overlapped and invisible portions are accumulated on the bucket, the shape can be estimated by superimposing partial images of the bolt B obtained from the image information so as to complement the absent portions. Therefore, even if the work pieces such as bolts B are randomly accumulated and overlapped with one another, the work piece shape can be recognized without CAD data.

The present invention in not limited only to the above embodiment. For example, the image information obtaining unit may not be only limited to the camera, and a general camera may be used. In addition, a sensing device or an image sensor that employs a laser for obtaining a distance-associated image information may be used. Further, in this embodiment, the categorization is performed based on the area ratio, the categorization may be performed based on the length, or upon taking the length information into consideration.

INDUSTRIAL APPLICABILITY

According to the present invention, the edge detection unit can detect edges from the image information obtained by the image information obtaining unit, the separating unit can separate partial images of overlapped multiple work pieces from the image information obtained by the edge detection, the work piece categorization unit can categorize the separated partial images of the work pieces, and the estimated work piece shape generation unit can generate an estimated work piece shape from the categorized partial images of the work pieces. Therefore, it is easy to recognize randomly accumulated and unarrayed work pieces without the presence of CAD data of the work piece.

In addition, even from a work piece having an overlapped and invisible portion, a work piece shape can be estimated by superimposing the work piece partial image data obtained from the image information so as to complement the absent portion.

Moreover, the work piece categorization unit may categorize the partial images upon taking characteristic portions or the areas into consideration, so as to further speed up the process.

REFERENCE SIGNS LIST 1 camera (image information obtaining unit)
4 edge detector (edge detection unit)
5 image separator (separating unit)
6 partial image categorizer (work piece categorization unit)
7 estimated work piece shape generator (estimated work piece shape generation unit)
a-q partial images
B Bolts (work pieces)

The invention claimed is:

1. A work piece shape estimation device, comprising:
an image information obtaining unit configured to obtain image information without access to CAD data by capturing an image of multiple randomly accumulated work pieces that overlap one another, wherein the work pieces are identical to one another in shape;
an edge detection processor configured to perform an edge detection on the image information obtained by the image information obtaining unit;
a separating processor configured to separate the work pieces into partial images based on the image information obtained by the edge detection processor;
a work piece categorization processor configured to categorize the separated partial images of the work pieces into different categories by performing pattern matching on each of the respective partial images and by organizing the partial images based upon a shape of each of the respective partial images, wherein the work piece categorization processor arranges the partial images within each of the different categories based upon an area of each of the partial images; and
an estimated work piece shape generation processor configured to generate an estimated shape of the work piece by complementing an absent portion of the partial images of the work pieces categorized by the work piece categorization processor, wherein the estimated work piece shape generation processor generates the estimated shape of the work piece by selecting one of the different categories so as to define a selected category and selecting the partial image within the selected category that has a greatest area of all of the partial images within the selected category so as to define the largest partial image, and wherein the estimated work piece shape generation processor superimposes the partial images from the selected category on top of the largest partial image in order of decreasing area.

2. The work piece shape estimation device according to claim 1,
wherein the work piece categorization processor only assigns a priority rank to the partial images that have an area that is at least 50% of an area of the estimated shape of the work piece.

3. A work piece shape estimation method, comprising:
obtaining image information without access to CAD data by capturing an image of multiple randomly accumulated work pieces which are allowed to overlap, wherein the work pieces are identical to one another in shape;
performing an edge detection on the obtained image information;
separating the work pieces into partial images based on the edge detection of the image information;
categorizing the separated partial images of the work pieces into different categories by performing pattern matching on each of the respective partial images and by organizing the partial images based upon a shape of each of the respective partial images, wherein the partial images are categorized based on an area of each of the partial images;
selecting one of the different categories so as to define a selected category;
selecting the partial image within the selected category that has a greatest area of all of the partial images within the selected category so as to define a largest partial image; and
generating an estimated shape of the work piece by complementing an absent portion of the partial images of the categorized work pieces by superimposing the partial images from the selected category on top of the largest partial image in order of decreasing area.

4. The work piece shape estimation method according to claim 3,
wherein a priority rank is only assigned to the partial images that have an area that is at least 50% of an area of the estimated shape of the work piece.

* * * * *